US010405010B2

(12) United States Patent
Parasseeri et al.

(10) Patent No.: US 10,405,010 B2
(45) Date of Patent: Sep. 3, 2019

(54) METHODS, SYSTEMS, AND DEVICES FOR ADJUSTING STREAMING VIDEO FIELD-OF-VIEW IN ACCORDANCE WITH CLIENT DEVICE COMMANDS

(71) Applicant: SLING MEDIA PVT LTD, Bangalore (IN)

(72) Inventors: Husain Ahmed Parasseeri, Kerala (IN); Melvin Perinchery, Kerala (IN)

(73) Assignee: SLING MEDIA PVT LTD, Bangaluru (IN)

( * ) Notice: Subject to any disclaimer, the term of this patent is extended or adjusted under 35 U.S.C. 154(b) by 57 days.

(21) Appl. No.: 15/726,052

(22) Filed: Oct. 5, 2017

(65) Prior Publication Data

US 2019/0110087 A1   Apr. 11, 2019

(51) Int. Cl.
*H04N 5/225*      (2006.01)
*H04N 21/218*     (2011.01)
*G06T 19/00*      (2011.01)
*H04N 21/2187*    (2011.01)

(52) U.S. Cl.
CPC ..... *H04N 21/21805* (2013.01); *G06T 19/003* (2013.01); *H04N 21/2187* (2013.01); *H04N 5/2259* (2013.01)

(58) Field of Classification Search
None
See application file for complete search history.

(56) References Cited

U.S. PATENT DOCUMENTS

| 2013/0235071 A1* | 9/2013 | Ubillos ................. G06F 3/0484 345/600 |
| 2015/0067721 A1* | 3/2015 | Cadena Vedova .......................... H04N 21/41407 725/32 |
| 2017/0155557 A1* | 6/2017 | Desai .................... H04L 41/147 |
| 2017/0257560 A1* | 9/2017 | Edpalm ................ H04N 19/513 |
| 2019/0005986 A1* | 1/2019 | Peters .................... H04S 7/303 |

* cited by examiner

*Primary Examiner* — Eileen M Adams
(74) *Attorney, Agent, or Firm* — Lorenz & Kopf LLP

(57) ABSTRACT

Methods, systems, and devices are provided for enabling client-controlled adjustments in the Field-of-View (FOV) of streaming video content principally through changes in server encoding parameters. In various embodiments the method includes the step or process of receiving, at a client media receiver, an encoded video stream transmitted from a streaming media server over a communications network. The encoded video stream is processed, at the client media receiver, to generate a video output signal for presentation on a display device associated with the client media receiver. The client media receiver monitors for user input modifying a FOV of the video output signal. When receiving user input modifying the FOV of the video output signal, the client media receiver then transmits a FOV modification command to the streaming media server to modify a FOV of the encoded video stream in accordance with the user input.

20 Claims, 6 Drawing Sheets

Figure 1:
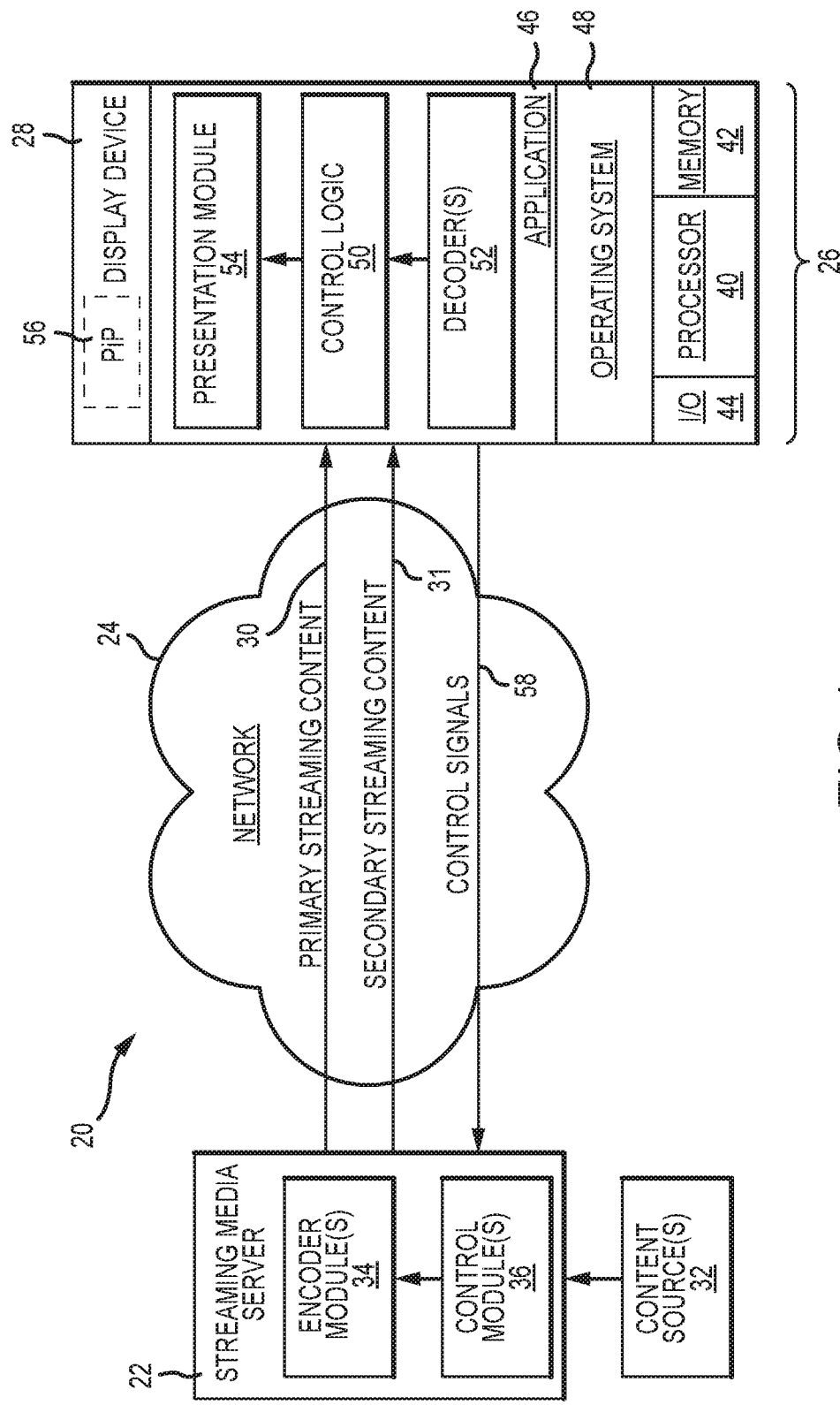

METHODS, SYSTEMS, AND DEVICES FOR ADJUSTING STREAMING VIDEO FIELD-OF-VIEW IN ACCORDANCE WITH CLIENT DEVICE COMMANDS

TECHNICAL FIELD

The following disclosure generally relates to media streaming services and, more particularly, to methods, systems, and devices for enabling client-controlled adjustments in the field-of-view of streaming video content, as implemented partially or wholly through alterations in server encoding parameters.

ABBREVIATIONS

CDN—Content Delivery Network;
DVI—Digital Video Interface;
DVR—Digital Video Recorder;
FOV—Field-of-View;
HDMI—High Definition Multimedia Interface;
I/O—Input/Output;
LAN—Local Area Network;
OTT—Over-The-Top;
PIP—Picture-in-Picture;
SPDIF—Sony/Philips Display Interface Format;
STB—Set-Top Box;
VOD—Video On Demand;
VPN—Virtual Private Network; and
WAN—Wide Area Network.

BACKGROUND

Media streaming services enhance the ease and convenience with which end users consume streaming content, such as VOD, OTT television, and placeshifted content. Media streaming services are, however, often limited by resource constraints affecting network reliability and bandwidth availability. When network bandwidth becomes undesirably constrained during a streaming video session, latencies may occur resulting in prolonged buffering and other delays in the presentation of streaming video content. Network latencies can also result in sluggish response times in implementing user-issued commands during a streaming video session, such as user channel change requests received when streaming OTT television content. Adaptive streaming techniques have been developed to enhance streaming media performance despite such variances in network bandwidth.

As conventionally implemented, adaptive streaming techniques minimize streaming bitrate through controlled degradations to the image resolution, the video frame rate, or both the image resolution and frame rate of streaming video content. In certain instances, multiple sets of packetized streaming files or "streamlets" may be proactively encoded at varying image qualities and/or frame rates to generate a high bandwidth stream, a low bandwidth stream, and any number of intermediate bandwidth streams. The consumer electronic device utilized to receive the streaming video content (herein, a "client media receiver") can then select and reselect, as desired, the stream bandwidth best suited for current playback conditions. In other instances, adaptive streaming techniques may be implemented by actively adjusting encoding parameters in response to a monitored parameter affecting network bandwidth. For example, in this latter case, a streaming media server may vary its encoding parameters during a given streaming video session to encode streaming video at lower image resolutions and/or at decreased video frame rates as network bandwidth becomes increasingly constrained.

BRIEF SUMMARY

The following describes methods by which streaming video performance is enhanced through client-controlled adjustments in the FOV of streaming video content. In various embodiments, the streaming FOV modification method includes the step or process of receiving, at a client media receiver, an encoded video stream transmitted from a streaming media server over a communications network. The encoded video stream is processed by the client media receiver to generate a video output signal, which is then supplied to a display device associated with the client media receiver for presentation. While generating the video output signal, the client media receiver monitors for user input modifying a FOV of the video output signal. When receiving such user input, the client media receiver transmits a FOV modification command to the streaming media server to modify a FOV parameter of the encoded video stream in accordance with the newly-received user input. In an embodiment, the FOV parameter may specify one or more of the following: a change in zoom factor or magnification of the streaming video FOV, a desired zoom aspect ratio, and a particular region or item on which to center the FOV-modified video stream. The streaming media server may then implement the requested change in continued transmission of the streaming video content and maintain the requested change until subsequently determining that the FOV modification should be terminated.

In another embodiment, the method includes the step or process of generating, at a streaming media server, an encoded video stream having a FOV. The encoded video stream is transmitted over a communications network to a client media receiver. While the encoded video stream is continually transmitted to the client media receiver, the streaming media server monitors for FOV modification commands; that is, commands requesting adjustments to the FOV of the encoded video stream. The FOV modification commands are issued by the client media receiver, which generates such commands based upon user input received at an interface of the receiver. When receiving a FOV modification command from the client media receiver, the streaming media server modifies the FOV of the encoded video stream in accordance with the received command. Afterwards, the streaming media server may return to encoding the video streaming at a default FOV when subsequently receiving a command from the client media receiver to terminate the requested FOV modification, after elapse of a time period having a predetermined duration, or in response to another termination event. For example, the streaming media server may maintain the FOV modification specified by the FOV modification command until elapse of a time period, the duration of which may be selected based upon a monitored parameter of the communications network, such as network latency or bandwidth constraints.

In further embodiments, a client media receiver includes a processor and a computer-readable storage medium, which stores computer-executable instructions or code. When executed by the processor, the computer-executable code causes the client media receiver to perform the operations of: (i) receiving an encoded video stream transmitted from a streaming media server over a communications network; (ii) processing the encoded video stream to generate a video output signal containing imagery for presentation on a display device associated with (e.g., included in or operably connected to) the client media receiver; and (iii) monitoring for user input modifying a FOV of the video output signal. When user input modifying the FOV of the video output signal is received, the client media receiver transmits a command over the communications network to the streaming media server to modify a FOV parameter of the encoded video stream in accordance with the user input. If desired, the modification command may specify a time period over the requested FOV modification is desirably maintained. Additionally, in certain implementations, the client media receiver may also initially and temporary implement the user-requested FOV modification by local processing of the encoded video stream when generating the video output signal. The client media receiver may continue to implement the user-requested FOV modification in this manner until such time as the FOV-modified encoded video stream is received from the server.

The methods set-forth above and described elsewhere in this document can be implemented utilizing complementary program products, such as software applications executed on suitably-equipped client media receivers and streaming media servers. Various additional examples, aspects, and other useful features of embodiments of the present disclosure will also become apparent to one of ordinary skill in the relevant industry given the additional description provided below.

BRIEF DESCRIPTION OF THE DRAWING FIGURES

Figure 2:
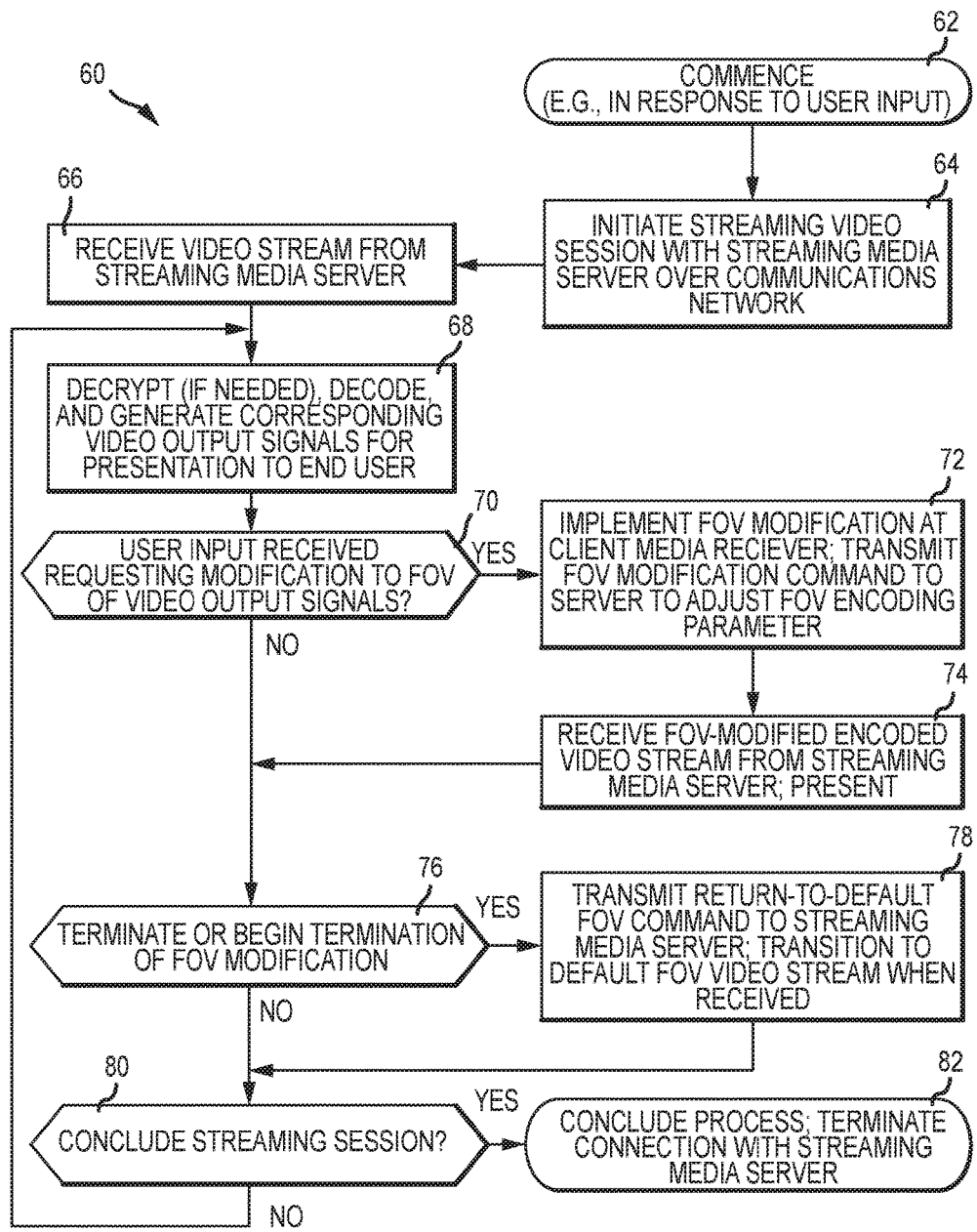

Exemplary embodiments will hereinafter be described in conjunction with the following drawing figures, wherein like numerals denote like elements, and:

FIG. 1 schematically depicts an exemplary streaming media system suitable for supporting streaming video sessions between a client media receiver and a streaming media server, which encodes streaming video content to varying FOV parameters as requested or instructed by the client media receiver;

FIG. 2 is a flowchart setting-forth an exemplary streaming FOV modification method, which can be carried-out by the client media receiver and the streaming media server shown in FIG. 1 in an embodiment; and FIGS. 3-6 are screenshots illustrating several exemplary types of touch input usefully recognized by the client media receiver and utilized to generate corresponding FOV modification commands transmitted to the streaming media server during the streaming FOV modification method of FIG. 2.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the claims, in any respect.

Overview

Methods, systems, and devices are provided for enabling client-controlled adjustments in the FOV of streaming video content, as implemented partially or wholly through changes in server encoding parameters. Embodiments of the methods may be carried-out during a streaming video session initiated between a streaming media server and a client media receiver. During the streaming video session, the streaming media server transmits encoded video content to the client media receiver, while selectively modifying one or more parameters affecting the FOV of the encoded video content. The streaming media server implements such FOV modifications in accordance with commands or instructions received from the client media receiver. Such receiver-issued instructions to modify the FOV of streaming video content are referred to herein as "FOV modification commands." An FOV modification command can include or assume the form of instructions to modify a zoom factor or magnification factor of the encoded video content; e.g., data specifying whether the FOV of the encoded video content is desirably subject to inward or outward zooming and, if so, the extent of such zooming. Additionally or alternatively, a given FOV modification command may specify a particular region or feature on which to center the FOV-modified version of the encoded video stream (herein, the "FOV-modified video stream"), a desired aspect ratio of the FOV-modified video stream, a desired image resolution of the FOV-modified video stream, and/or other such parameters.

In certain embodiments, the client media receiver may, when possible, initially and temporarily implement the user-requested FOV modification to the video output signal through local image processing tasks, such as upscaling when inwardly zooming on a particular region of the video image in accordance with user input. The client media receiver may commence such local image processing at essentially the same time as the receiver transmits the corresponding FOV modification command to the streaming media server. Accordingly, the client media receiver may perform those processing tasks appropriate to apply FOV modification requests to the video output signal supplied to the display device. Following implementation of the desired FOV modification by the streaming media server in continued encoding and transmission of the streamed video content, the client media receiver may then cease such additional image processing tasks upon receipt of the FOV-modified video stream. This allows user FOV modification requests to be implemented in an instantaneous or near instantaneous manner, while the overall processing demands placed on the client media receiver are lessened over the course of a given streaming video session. In embodiments, FOV modifications implemented by the streaming media server may be maintained until a termination or "return-to-default FOV" instruction is received from the client media receiver. Alternatively, the FOV modification may be maintained by the streaming media server until the occurrence of a predetermined trigger event, such as the elapse of a static or dynamic time period.

By implementing user requests to modify the FOV of presented video content through changes in server encoding parameters, a number of benefits can be realized. As noted above, such an approach may help alleviate processing loads placed on the client media receiver during a streaming video session. Additionally, in certain instances, a reduction in streaming bitrate may be realized by, for example, the omission of extraneous image data when implementing a zoom-in command or when the uniquely-specified FOV aspect ratio enables cropping of such extraneous image data from the encoded video stream. As a further possibility, in the case of 360 degree (°) video compiled from multiple sources, the encoded video stream can be optimized to favor the particular video feed currently presented to an end user; e.g., by encoding the video feed presented to the end user at a given juncture in time at an enhanced image resolution, a higher video frame rate, or the like as compared to the other video streams forming the 360° video stream. The viewing experience of the end user may be enhanced as a result, while bandwidth costs are reduced. Still other benefits can also be realized through implementations of the methods and devices described herein; e.g., in certain cases, additional functionalities may be introduced, such as the ability to center a modified FOV on stationary or movable objects appearing within the streamed video image. An exemplary streaming media system suitable for performing such streaming FOV modification methods will now be described in conjunction with FIG. 1.

Example of Streaming Media System Supporting Streaming Client-Issued FOV Modification Commands FIG. 1 schematically illustrates an exemplary streaming media system 20 suitable for implementing embodiments of the streaming FOV modification method described herein. In the illustrated example, streaming media system 20 contains at least one streaming media server 22, a communications network 24, a client media receiver 26, and a display device 28. During a streaming video session, streaming media server 22 transmits one or more video-containing content streams 30, 31 through communications network 24 to client media receiver 26. Streaming media server 22 may repeatedly encode, packetize, and transmit a single video content stream 30 during the streaming video session. Additionally, in certain instances, streaming media server 22 may also transmit one or more secondary content streams 31 to client media receiver 26 in conjunction with transmission of primary streaming video content 30. For example, in this latter case, streaming media server 22 may transmit multiple content streams 30, 31, which each contain a different streaming channel, when a streaming OTT TV session is established with client media receiver 26 over network 24.

The content transmitted by streaming media server 22 to client media receiver 26 can be obtained from any number and type of content sources 32 in communication with server 22. As this content is supplied to server 22, streaming media server 22 encodes the received content utilizing one or more encoder modules 34, which operate under the command of one or more control modules 36. Streaming media server 22 subsequently transmits the encoded video content to client media receiver 26 in a packetized format over communications network 24. The encoded video stream or streams will often contain both video and audio component streams, which may be combined with other data utilized to support streaming media sessions, such as packet identification data. Any currently-known or later-developed packetized format can be employed by streaming media server 22 including, but not limited to, MPEG, QUICKTIME, WINDOWS MEDIA, and/or other formats suitable for transmission over communications network 24.

Communications network 24 can assume any form enabling the transmission of streaming video content 30, 31 and otherwise supporting data transmission between streaming media server 22 and client media receiver 26 during a streaming video session. In this regard, communications network 24 can contain one or more open CDNs, VPNs, the Internet, and various other communications networks implemented in accordance with TCP/IP protocol architectures or other conventional protocols. Communications network 24 may contain any number of digital or other networks enabling multiple nodes (e.g., devices 22, 26) to communicate with each other using any common protocols and signaling schemes. In various embodiments, network 24 may further encompass one or more wired or LANs, WANs, a cellular network, and/or any other pubic or private networks. Communications network 24 as illustrated in FIG. 1, then, is intended to broadly encompass any communications network(s), systems, or architectures for transmitting data between the various components of streaming media system 20.

Client media receiver 26 can be any device, system, player, or the like suitable for performing the processes described herein. A non-exhaustive list of such devices includes mobile phones, wearable devices, tablets, laptop computers, desktop computers, gaming consoles, DVRs, and STBs. When engaged in a video streaming session with streaming media server 22, client media receiver 26 generates video output signals, which are delivered to display device 28 for presentation to one or more end viewers. Client media receiver 26 will also typically generate corresponding audio signals, which may be supplied to display device 28 or an auxiliary speaker system, but this is not strictly necessary. As discussed more fully below, the video output signals generated by client media receiver 26 have an associated FOV, which may be adjusted through input commands received via a user input interface. When detecting user input requesting a change in the FOV of the presented video content, client media receiver 26 may transmit a corresponding FOV modification command to streaming media server 22 over network 24. In various implementations, client media receiver 26 may also concurrently perform certain processing tasks to implement the requested change to the FOV of the video output signal. Receiver 26 may continue to perform these processing tasks until such time as streaming media server 22 receives and implements the requested FOV modification to the encoded video stream.

Display device 28 can be integrated or incorporated into client media receiver 26 as a unitary system or single electronic device in embodiments. Display device 28 will commonly be integrated with client media receiver 26 as a single electronic device when receiver 26 assumes the form of a mobile phone, tablet, laptop computer, a wearable device, or similar electronic device having a dedicated display screen. Notably, in implementations in which device 28 and receiver 26 are integrated or combined as a single device, the electronic signals supplied to display device 28 by client media receiver 26 are still considered "video output signals" in the present context as such signals are outputted from one internal component or module and supplied to a second component or module. In other embodiments, display device 28 can assume the form of an independent or discrete device, such as a freestanding monitor or television set, operably coupled to client media receiver 26 via a wired or wireless connection. In such latter implementations, client media receiver 26 will commonly assume the form of a gaming console, a DVR, an STB, or a similar peripheral device. The video output signals generated by client media receiver 26 may be formatted in accordance with conventionally-known standards in this case including, but not limited to, S-video, HDMI, SPDIF, DVI, or IEEE 1394 standards.

In the illustrated example, client media receiver 26 contains at least one processor 40 and a storage medium or memory 42, which is accessible to processor 40. Memory 42 stores computer-readable instructions or code, which can be executed by processor 40 to perform the various functions and processing tasks described herein. Such computer-readable instructions may include one or more software applications 46 of the type described below. In addition to processor 40 and memory 42, client media receiver 26 also includes a number of I/O features 44. I/O features 44 can include, for example, a network interface to communications network 24, an interface to mass storage (e.g., included in memory 42), an interface to display device 28 (when assuming the form of independent electronic device). Additionally, I/O features 44 can include various types of user input interfaces, such as a touchscreen interface, a keyboard interface, and/or a cursor-based user interface.

During operation, client media receiver 26 executes a software program or application 46, which directs the various hardware features of client media receiver 26 to perform the functions or operations described herein. Application 46 suitably interfaces with processor 40, memory 42, and I/O features 44 via any conventional operating system 48 to provide such functionalities. Software application 46 may be a placeshifting application in implementations in which streaming media server 22 is realized as a STB, DVR, or a similar consumer electronic device having placeshifting capabilities and often located within an end user's residence. In an embodiment, client media receiver 26 is implemented with special-purpose hardware or software, such as the SLINGCATCHER-brand products commercially available from Sling Media Inc., currently headquartered in Foster City, Calif., and/or any other products.

Application 46 suitably includes control logic 50 adapted to process user input, obtain streaming video content 30, 31 from one or more content sources 32, decode the received streams, and provide corresponding output signals to display device 28. Control logic 50 may establish a session with streaming media server 22 enabling wireless bidirectional communication with control module 36 such that a streaming video session can be established and maintained as described herein. Streaming video content 30, 31 is decoded utilizing known techniques. Decoding module 52 may be implemented using specialized hardware in some embodiments, although other embodiments may instead decode streaming video content 30, 31 utilizing software executing on processor 40. Decoded programming is forwarded to a presentation module 54, which then generates video output signals supplied to display device 28. In certain embodiments, presentation module 54 may combine decoded programming from multiple streaming channels to create a blended or composite image; e.g., as indicated in FIG. 1, one or more PIP images 56 may be superimposed over the primary imagery generated on display device 28.

When initiating and conducting a given streaming video session, streaming media server 22 responds to commands received from a client media receiver 26 via network 24, as generically indicated in FIG. 1 by arrow 58. Such commands can include information utilized in initiating streaming video sessions with streaming media server 22, including information supporting authentication of streaming media server 22 and client media receiver 26. In embodiments wherein streaming media server 22 serves as a consumer placeshifting device, such as a STB or DVR located in the residence of an end user, control commands 58 may include instructions to remotely operate the placeshifting device. Additionally, control commands 58 may contain instructions to adjust the FOV of streaming video content transmitted to client media receiver 26 by streaming media server 22. As previously noted and as discussed in detail below, such FOV modification commands usefully enable client-controlled adjustments in the FOV of streaming video content and, therefore, adjustments to the FOV of the downstream video output signals generated by receiver 26. Exemplary methods that can be carried-out by client media receiver 26, and complementary methods performed by streaming media server 22, in implementing such client-controlled streaming FOV modifications with now be described in conjunction with FIGS. 2-6.

Exemplary Methods Enabling Client-Controlled Modifications to Streaming Video FOV FIG. 2 is a flowchart setting-forth a streaming FOV modification method 60, which is illustrated in accordance with an exemplary embodiment of the present disclosure. Streaming FOV modification method 60 includes a number of process steps, which are identified as STEPS 62, 64, 66, 68, 70, 72, 74, 76, 78, 80, 82. Depending upon the particular manner in which FOV modification method 60 is implemented, each process step generally illustrated in FIG. 2 may entail a single process or multiple sub-processes. Furthermore, the steps illustrated in FIG. 2 and described below are provided by way of non-limiting example only. In alternative embodiments of streaming FOV modification method 60, additional process steps may be performed, certain steps may be omitted, and/or the illustrated steps may be performed in alternative sequences.

Streaming FOV modification method 60 commences with the receipt of user input requesting streaming transmission of selected media content (STEP 62). This request is received at client media receiver 26 and inputted by an end user utilizing, for example, a touchscreen device or other user interface included in I/O features 44 of receiver 26 (FIG. 1). In response to this user request, client media receiver 26 initiates a streaming video session with streaming media server 22 over communications network 24 (STEP 64). This entails the establishment of a bidirectional channel through network 24 over which client media receiver 26 and streaming media server 22 can communicate. Mutual authentication of receiver 26 and server 22 may be required and encryption applied, as desired. In accordance with commands received from client media receiver 26, streaming media server 22 (FIGS. 1-2) obtains and prepares the user-selected, video-containing media content for transmission to client media receiver 26 over network 24. The streaming video content can be obtained directly from any one of content sources 32; from a memory included within or otherwise accessible to streaming media server 22 when assuming the form of a DVR, STB, or other device having placeshifting capabilities; or from another source providing desired video or audiovisual content. When functioning as a placeshifting device, streaming media server 22 may capture, encode, encrypt (if desired), and transmit certain user-selected content to client media receiver 26 as a live content stream generated at server 22.

After initialization of the streaming video session, client media receiver 26 receives the streaming video content from streaming media server 22 over communications network 24 (STEP 66). As the content is received, client media receiver 26 decrypts (if needed) and decodes the content. Receiver 26 then utilizes the newly-decoded content to generate corresponding video output signals, which are forwarded to display device 28 for viewing by the end user operating receiver 26 (STEP 68, FIG. 2). This process is repeated, on an iterative or continual basis, as the streaming video session continues. While continuing to receive the streaming video content from server 22 and generating corresponding video output signals, client media receiver 26 monitors for input from the end user operating receiver 26 requesting modifications to the FOV of the presented video content and, therefore, to the FOV of the video output signal (STEP 70, FIG. 2). Again, user input requesting such FOV modifications can be received by client media receiver 26 via any suitable user input interface included in I/O features 44 (FIG. 1). This user input may be received as, for example, touch input or device-recognizable gestures, which are detected utilizing a touchscreen interface contained in client media receiver 26 and possibly incorporated into display device 28 in embodiments. Such user input may specify any number and type of FOV modification commands including, but not limited to, commands specifying zoom-in or zoom-out functionalities, commands changing the aspect ratio of the FOV, and commands altering the centering mode of the FOV, to list but a few examples.

If, at STEP 70, user input modifying the FOV of the video output signal has been received, client media receiver 26 progresses to STEP 72 of method 60. During STEP 72, client media receiver 26 identifies the FOV modification requested via the newly-received user input and then transmits a corresponding FOV modification command to streaming media server 22. The FOV modification command instructs streaming media server 22 to modify the FOV of the encoded video stream in accordance with the newly-received user input. When receiving and recognizing the FOV modification command, streaming media server 22 adjusts the FOV encoding parameters utilized in generating the video-containing content stream accordingly. Streaming media server 22 then returns the FOV-modified version of the encoded video to receiver 26 as the streaming video session continues (STEP 74). Additionally, in certain embodiments, the requested FOV modification to the video output signal may be initially implemented by client media receiver 26 through processing of the streaming video content, as further discussed below. Conversely, if user input has not been received requesting a change to the FOV of the video output signal, client media receiver 26 progresses to STEP 76 of FOV modification method 60.

In certain implementations, the FOV modification command transmitted from client media receiver 26 to streaming media server 22 during STEP 72 of method 60 may enable the modification of other parameters affecting the FOV of streaming video content. For example, the FOV modification commands may specify a desired aspect ratio and/or image resolution for usage in setting or establishing encoding parameters during continued transmission of the streaming video content. This may be useful when, for example, the streaming video content is presented on a display screen included in device 28 having an aspect ratio that varies relative to the default aspect ratio at which the encoded video stream is normally provided; e.g., as may be the case when, for example, client media receiver 26 assumes the form of a wearable device having a square or essentially square (e.g., 4:3 aspect ratio) display screen, while the streaming video is typically encoded to the more common wide screen (16:9 aspect ratio) format by default. Additionally or alternatively, if the resolution of the display screen associated with client media receiver 26 is less than that to which the streaming video is typically encoded, by default, receiver 26 may request a lower bitrate stream encoded to lower image resolution. A favorable reduction in streaming bitrate and a corresponding improvement in streaming performance may consequently be achieved during the streaming video session.

Client media receiver 26 may initially and temporarily implement the user-requested FOV modification to the video output signal through local image processing tasks, when possible. In this regard, client media receiver 26 may determine whether the requested modification to the FOV of the video output signal can be implemented by receiver 26 itself after receiving user input modifying the FOV of the video output signal; and, if determining that this is possible, receiver 26 may process the encoded video stream to implement the requested modification to the video output signal FOV. Client media receiver 26 may commence such additional image processing tasks in conjunction with transmission of the FOV command to streaming media server 22 during STEP 72 of method 60 (FIG. 2). Consider, for example, a scenario in which user input is detected reflecting a user desire to zoom inwardly on a chosen region of the presented video image. In this case, client media receiver 26 may initially perform the upscale processing tasks required to implement the user-requested zoom-in function to the video output signal supplied to display device 28. At essentially the same time, client media receiver 26 may transmit the above-described FOV modification command to streaming media server 22 to begin encoding the streamed content in accordance with user zoom request. When the receiving the encoded content stream having the requested FOV modification, client media receiver 26 may transition to presentation of the FOV-modified video stream, rather than performing local processing to implement the requested FOV modification to the video output signal.

The above-described process provides several notable benefits. First, upon receipt of the FOV-modified encoded video stream from streaming media server 22, the processing demands placed on processor 40 of client media receiver 26 are reduced as processor 40 no longer needs to perform additional tasks to modify the native FOV of the encoded video stream in generating the video output signals. Moreover, an opportunity is presented enabling client media receiver 26 to communicate other encoding parameters (e.g., specified image resolutions) for usage by streaming media server 22 in further streaming transmission of the encoded video stream. Thus, in the present example in which a zoom-in command is implemented, client media receiver 26 may transmit data informing streaming media server 22 that only a limited region of the imagery is currently presented to the end user via the video output signals generated by receiver 26. Streaming media server 22 may then generate the encoded video stream to exclude or crop any extraneous imagery, which server 22 would otherwise include in the encoded video stream by conventional practice. The packet size and streaming bitrate of the encoded video stream may be reduced as a result. A similar benefit may also be realized when streaming 360° video content to receiver 26. In this latter case, the FOV modification request may include data specifying a particular region of the 360° video content currently presented to the end user. This data may then be leveraged by server 22 to reduce streaming bitrate through controlled reductions in the image resolution and/or frame rate of the other portions of the 360° video content not currently presented to the end user.

Next, at STEP 76 of FOV modification method 60, client media receiver 26 determines whether any presently-applied FOV modification to the video output signal should be sustained. In implementations in which FOV modifications are terminated in response to user input, client media receiver 26 may determine whether user input has been received requesting termination of the current FOV modification and, therefore, return to encoding the streaming video content at a non-modified (default or native) FOV. In other implementations, FOV modifications may be terminated automatically in response to a trigger event, such as elapse of a predetermined time period. When transmitting the FOV modification command to streaming media server 22, client media receiver 26 may append the modification command to include data specifying the duration of a time period over which to maintain the requested modification to the FOV of the video output signal. The duration of the time period may be defined by user input selecting the length of the time period; may be determined by receiver 26 such that the time period length varies based, at least in part, on a monitored parameter of network 24 (e.g., a current network bandwidth or latency measurement); and/or otherwise varied.

In various embodiments, the FOV termination process may commence prior to elapse of the time period to ensure that the currently-implemented FOV modification is removed when desired. In one possible approach, this is accomplished utilizing a time buffer $T_1$, which accounts for network delays in removal of the FOV modification. As an example, if it is desired for FOV modifications to terminate automatically (that is, without requiring additional user input) after a ten second period, client media receiver 26 may request termination of the FOV modification at time buffer $T_1$ (e.g., two to five seconds) ahead of the elapse of the ten second period. This may help compensate for delays in receipt of the command at server 22, processing by server 22, and subsequent receipt of the encoded video stream having the default FOV at client media receiver 26 due to network latencies or bandwidth constraints. In such embodiments, time buffer $T_1$ may be assigned a fixed or static value or, instead, may be assigned a value that varies dynamically in conjunction with network bandwidth constraints or another monitored parameter impacting latency.

Lastly, at STEP 80 of FOV modification method 60 (FIG. 2), client media receiver 26 determines whether the current streaming video session is desirably maintained or is instead desirably terminated. If determining that the streaming session should continue, client media receiver 26 returns to STEP 68 and the above-described process steps repeat. Consequently, in this case, STEPS 68, 70, 72, 74, 76, 78, 80 of method 60 will loop until cessation of the current streaming video session is requested by an end user or otherwise deemed appropriate. If, instead, determining that the current video streaming session is desirably terminated at STEP 80, client media receiver 26 progresses to STEP 82 (FIG. 2) and performs those actions appropriate to conclude the current streaming session.

There has thus been described an exemplary and non-limiting embodiment of an FOV modification method enabling client-controlled adjustments in the FOV streaming video content, principally through modifications or adjustments in server encoding parameters. Generally stated, embodiments of FOV modification method 60 (FIG. 2) entail the following steps or processes performed by streaming media server 22: (i) encoding selected video content to yield encoded video content having FOV; (ii) while encoding the selected video content, adjusting the FOV of the encoded video content in accordance with FOV modification commands received from client media receiver 26; and (iii) transmitting the encoded video content over communications network 24 to client media receiver 26 for presentation on display device 28. Further, as discussed above, various types of FOV modification commands can be issued by client media receiver 26 and transmitted to streaming video server 22 during a given streaming video session. To further emphasize this point, additional description of different types of user-issued FOV modification commands usefully employed during embodiments of method 60 (FIG. 2) will now be described in conjunction with FIGS. 3-6.

Examples of FOV Modification Commands

FIGS. 3-6 illustrate several different FOV commands potentially implemented during the course of streaming FOV modification method 60. For consistency, an identical video frame image is shown in each of FIGS. 3-6, namely, a streaming video image 90 of a soccer game or football match. In keeping with the foregoing description, streaming video image 90 is described below as rendered on display device 28 in accordance with the video output signals supplied by client media receiver 26. As further described above, client media receiver 26 generates such signals by processing the encoded video stream supplied by streaming media server 22. During the streaming video session, client media receiver 26 monitors for user input specifying different commands, which, for purposes of this example, may be considered user touch input specifying unique FOV modifications commands. Through computer-readable instructions contained in application 46 (FIG. 1) and suitable hardware features contained in I/O features 44 (FIG. 1), client media receiver 26 may recognize several different types of user touch input representing different FOV modification commands. Client media receiver 26 may perform streaming FOV modification method 60, beginning at STEP 70 (FIG. 2), when receiving user input requesting changes to the FOV of the video output signal and, therefore, to the imagery presented on display device 28.

Figure 3:
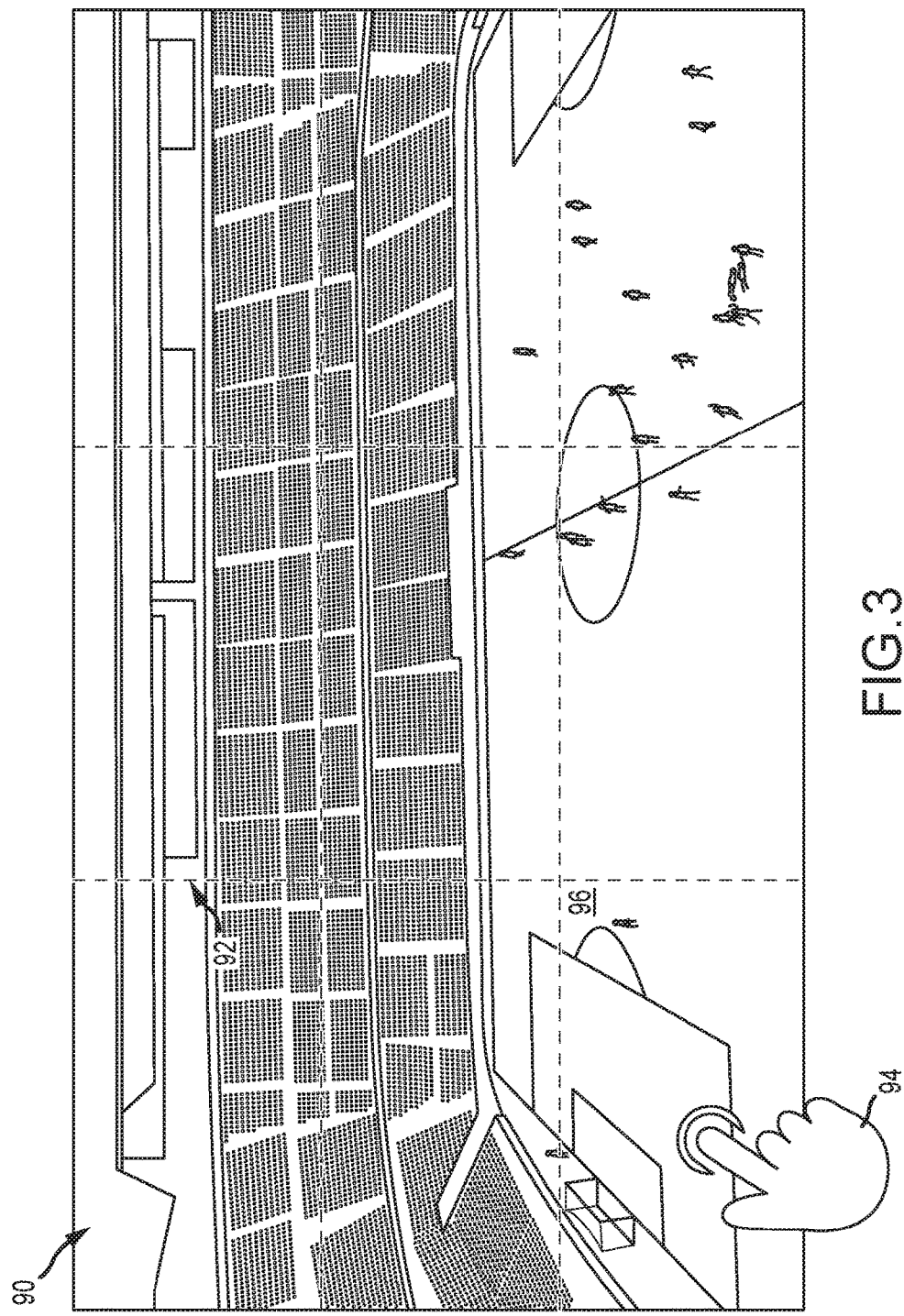

With initial reference to the example of FIG. 3, streaming video image 90 is divided into several regions by a number of lines forming a grid 92. Grid 92 will typically not be displayed in actual practice, but is shown in FIG. 3 for purpose of explanation. In this example, grid 92 divides streaming video image 90 into nine rectangular regions on which a user may zoom inwardly, if and when desired (herein, "zoom-selectable regions"). The number, size, shape, and spatial distribution of the zoom-selectable regions may vary in further embodiments. During a given streaming video session, an end user may select a particular region of streaming video image 90 for inward zooming utilizing a pre-established input command; e.g., as indicated in FIG. 3 by touch icon 94, an end user may touch a particular region (here, region 96 located in the lower left corner of streaming video image 90) to zoom into the selected region. Processor 40 of client media receiver 26 recognizes this touch input and responds accordingly; e.g., upon recognition of such touch input, processor 40 may initially perform the upscaling processing tasks appropriate to zoom-in on a user-selected region 96. Accordingly, region 96 may now occupy the entirety the displayed image or, perhaps, only a portion thereof (e.g., as in the case of a PIP format).

In addition to performing the local upscaling process tasks, client media receiver 26 also transmits a corresponding FOV modification command (here, a zoom-in command) to streaming media server 22. The FOV modification command may specify the location and size (or zoom magnification) of the selected region. In certain cases the FOV modification command may also contain other pertinent information, such as data specifying a time period over which the FOV modification is desirably maintained, a desired image resolution, a screen aspect ratio of display device 28, and/or other parameters utilized by server 22 in generating the encoded video stream. After receiving and identifying the FOV modification command transmitted from client media receiver 26, streaming media server 22 implements the requested FOV modification in continued encoding and transmission of the video-containing content stream. Again, in the case of the exemplary zoom-in command, such as that denoted by the touch input shown in FIG. 3, streaming media server 22 may crop or eliminate extraneous image data from the FOV-modified video stream to reduce streaming bitrate. Additionally or alternatively, streaming media server 22 may encode the streamed video content to increase the resolution of the magnified image, if possible, to provide video images having a resolution higher than otherwise achievable through local upscaling by client media receiver 26. This may enhance the end user viewing experiencing by allowing regions of interest to be viewed in greater detail when the video source permits.

As indicated above, embodiments of the FOV modification approach are also usefully applied to 360° streaming video content. By common practice, 360° streaming video content is generated by compiling multiple video feeds concurrently provided by multiple video sources; e.g., a 360° video stream may be created by combining three appropriately-positioned camera feeds, each of which capture a different 120° FOV of the scene or event depicted by the streaming content. When appropriate, the FOV modification techniques described herein can be utilized to adjust the FOV of the presented portion of such 360° streamed video content in accordance with client commands and through corresponding adjustments in server encoding parameters. For example, when receiving corresponding FOV modifications commands from receiver 26, streaming media server 22 may alter encoding parameters to encode the video feed presently viewed by the end user at a higher image resolution, video frame rate, or the like. This, in turn, may allow a reduction in streaming bitrate and/or packet size, while having relatively little, if any impact on the viewing experience of the end user.

Figure 4:
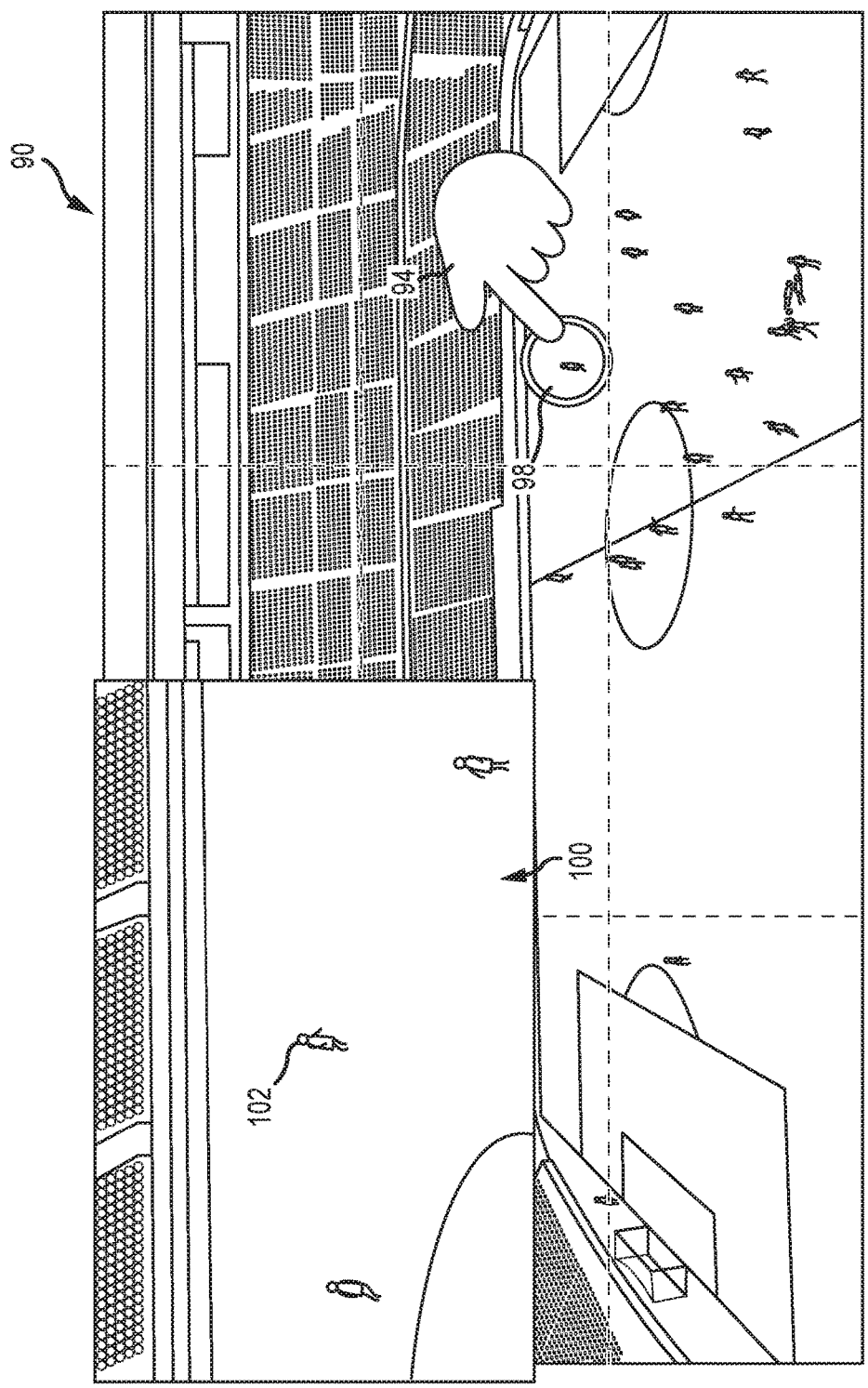

Advancing to FIG. 4, a further exemplarily scenario in which an end user provides touch input (represented by touch icon 94) is presented. Here, receiver 26 enables the end user to select a movable object or item (e.g., a player, a referee, the soccer ball or football, etc.) on which to zoom and, perhaps, to actively center or track when presenting the magnified video image. Accordingly, client media receiver 26 may perform the upscaling processing tasks appropriate to implement the requested zoom function, while concurrently transmitting a corresponding FOV modification command to streaming media server 22 in the previously-described manner. In certain instances, the user touch input may further indicate whether it is desired for the streaming video FOV to be actively centered and re-centered on (and, thus, track) a movable object appearing in streaming video image 90, such as a selected player 98. In this regard, client media receiver 26 may transmit an FOV modification command to streaming media server 22 instructing server 22 to generate the FOV-modified video stream in an active rather than passive centering mode and, specifically, to actively center the FOV-modified video stream on selected player 98 as the player moves about the field. If desired, a PIP image 100 may be generated and presented in accordance with the user-requested FOV modification; e.g., as indicated in the upper left corner of FIG. 4, PIP image 100 may be overlaid onto the larger streaming video image 90 depicting player 102 in greater detail. The various other FOV modification requests described herein can likewise be presented utilizing such a PIP window or other blended imagery, as appropriate.

Figure 5:
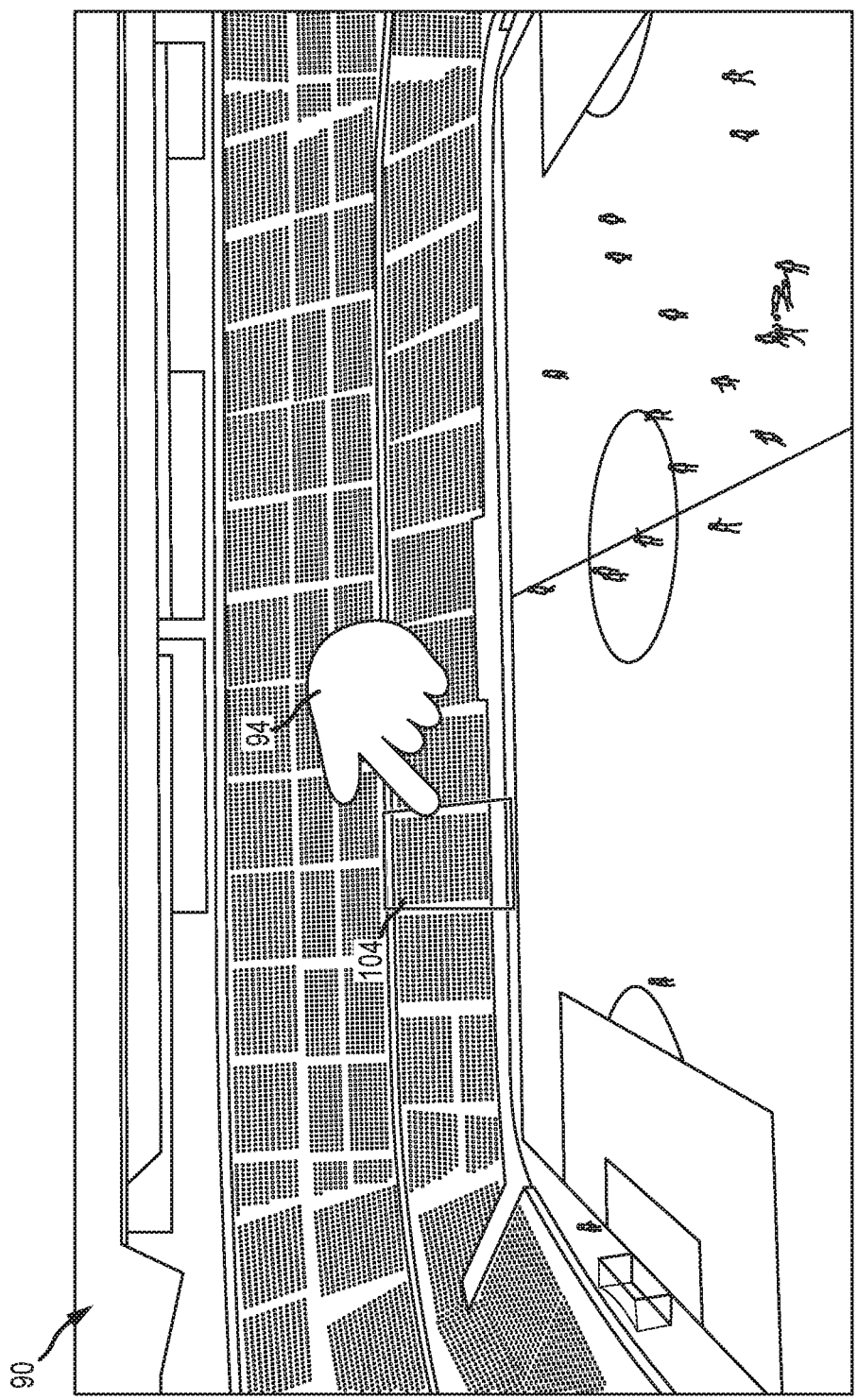
Figure 6:
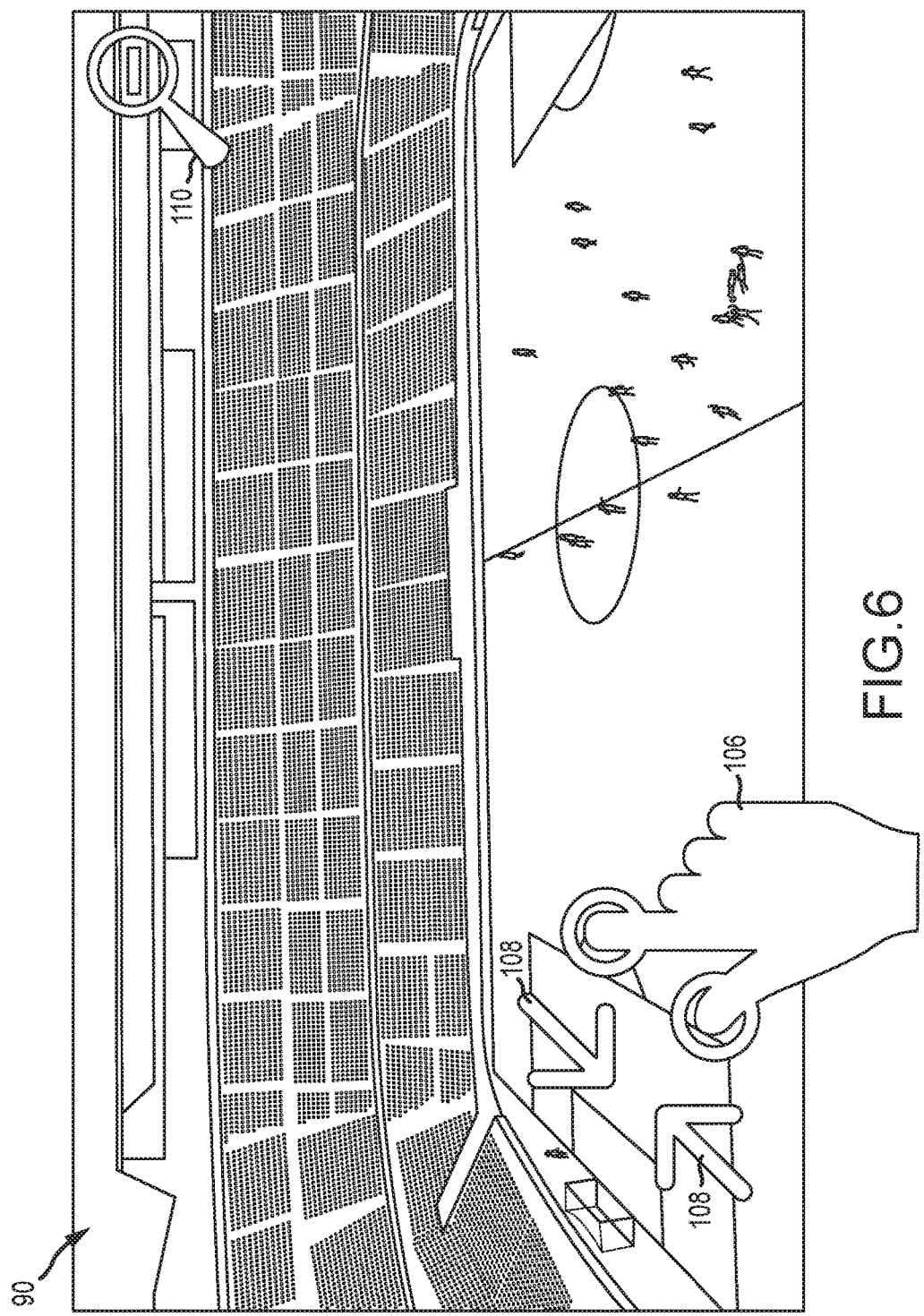

Turing lastly to FIGS. 5-6, additional examples of FOV modification commands are presented, which may performed to select stationary or fixed objects on which to center the FOV-modified video stream. As indicated in FIG. 5 by touch icon 94 and outline graphic 104, for example, an end user may select a particular section of the stadium seating or galley on which to zoom. Client media receiver 26 may then transmit an FOV modification command to streaming media server 22 to implement the requested change in FOV encoding parameters in further transmission of the encoded video stream. In other instances, client media receiver 26 may recognize additional forms of user touch input utilized to convey other types of FOV modification commands to client media receiver 26, which receiver 26 then relates to streaming media server 22. For example, as indicated in FIG. 6 by touch icon 106 and convergent arrows 108, an end user may utilize pinch commands to adjust the zoom factor/magnification. Specifically, a user may pinch inwardly to zoom in on selected portion of streaming video image 90, with the location and stroke range of the pinching motion generally denoting the location on which to zoom inwardly and the desired zoom factor, respectively. When recognizing such a touch input command, client media receiver 26 may immediately implement the zoom-in command, if possible, through appropriate upscale or downscale conversion tasks. Concurrently, client media receiver 26 transmits a corresponding FOV modification command to modify a FOV parameter of the encoded video stream in accordance with the newly-received user input.

With continued reference to FIG. 6, in certain instances, an end user may spread his or her fingers outward in a reverse pinching motion to zoom-out of streaming video image 90 in a manner substantially opposite the motion indicated by touch icon 106. When it is possible to zoom out from the native or default FOV at which streaming media server 22 typically transmits the encoded video stream, it may be desirable to visually indicate this possibility to the end user in some manner. For example, as further shown in FIG. 6, a zoom-out symbol 110 may be overlaid onto streaming video image 90 providing a visual cue that a user may utilize a reverse pinch command or another pre-established type of input (e.g., by touching symbol 110, which may serve as a virtual button) to zoom outwardly from the streamed image. Symbol 110 may be embedded in the encoded video stream transmitted by streaming media server 22 or, instead, overlaid onto the video output signals by client media receiver 26 upon determining (e.g., in response to a query transmitted from receiver 26 to server 22) that the encoded video stream can be received at a wider FOV, if so desired.

CONCLUSION

There has thus been provided embodiments of systems, methods, and program products for modifying the FOV of streamed video content in accordance with client device commands. Such FOV modifications can include zoom-in and zoom-out commands, commands altering the aspect ratio and/or centering of streaming video content, and other commands defining FOV-related parameters at which the streamed video content is desirably encoded. By performing such FOV modifications at the encoding level of the streaming media server, processing demands placed on the client media receiver can be reduced. Additionally, in certain instances, the user-requested adjustments to the FOV of the streaming video content may enable a reduction in packet size or otherwise reduce streaming bitrate. Moreover, the transmission of such FOV modification commands may enable reductions in streaming bitrate and/or may provide additional functionalities, such as the ability to change centering modes, to further enhance the viewing experience of the end user. Embodiments of the above-described FOV modification method can also be applied to enhance streaming video performance when streaming 360° video content.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method carried-out during a streaming video session occurring between a client media receiver and a streaming media server, the method comprising:
    receiving, at the client media receiver, an encoded video stream transmitted from the streaming media server over a communications network;
    processing the encoded video stream, at the client media receiver, to generate a video output signal containing imagery for presentation on a display device associated with the client media receiver;
    monitoring, at the client media receiver, for user input modifying a Field-of-View (FOV) of the video output signal;
    in response to receipt of user input modifying the FOV of the video output signal, transmitting a FOV modification command from the client media receiver to the streaming media server to modify a FOV of the encoded video stream in accordance with the user input wherein the FOV modification command transmitted maintains the FOV modification until an elapse of a time period, and for a duration of the time period by data extracted from the FOV modification command.

2. The method of claim 1 further comprising, in conjunction with transmitting the FOV modification command from the client media receiver to the streaming media server, initially implementing the requested modification to the FOV of the video output signal by local processing at the client media receiver.

3. The method of claim 2 further comprising ceasing implementation of the requested modification to the FOV of the video output signal by local processing when receiving the encoded video stream having a FOV modified in accordance with the user input from the streaming media server.

4. The method of claim 1 further comprising, when transmitting the FOV modification command from the client media receiver to the streaming media server, including data in the modification command specifying a time period over which the requested modification to the FOV of the encoded video content should be maintained.

5. The method of claim 1 further comprising, at the client media receiver:
    after receiving user input modifying the FOV of the video output signal, monitoring for additional user input terminating the requested modification to the FOV of the video output signal; and
    when receiving additional user input terminating the requested modification to the FOV of the video output signal, transmitting a return-to-default FOV command from the client media receiver to the streaming media server.

6. The method of claim 1 further comprising, when transmitting the FOV modification command from the client media receiver to the streaming media server, including data in the modification command specifying an aspect ratio of a screen of the display device.

7. The method of claim 6 further comprising, at the streaming media server, cropping extraneous image data from the encoded video stream based, at least in part, on the aspect ratio of the screen of the display device.

8. The method of claim 1 further comprising, when transmitting the FOV modification command from the client media receiver to the streaming media server, including data in the modification command specifying a desired image resolution of the encoded video stream.

9. The method of claim 1 further comprising, at the client media receiver:
    determining a zoom magnification and centering from the user input modifying a FOV of the video output signal; and
    when transmitting the FOV modification command from the client media receiver to the streaming media server, including data in the FOV modification command identify the determined zoom magnification and centering.

10. A method carried-out during a streaming video session occurring between a client media receiver and a streaming media server, the method comprising:
    generating, at the streaming media server, an encoded video stream having a Field of View (FOV);
    transmitting the encoded video stream over a communications network to the client media receiver;
    monitoring for FOV modification commands from the client media receiver requesting adjustments to the FOV of the encoded video stream; and
    when receiving a FOV modification command from the client media receiver, modifying the FOV of the encoded video stream in accordance with the received FOV modification command wherein the FOV modification command maintains the FOV modification until an elapse of a time period, and for a duration of the time period by data extracted from the FOV modification command.

11. The method of claim 10 further comprising, at the streaming media server, maintaining the FOV modification specified by the FOV modification command until receiving a return-to-default FOV command from the client media receiver.

12. The method of claim 10 further comprising, at the streaming media server, maintaining the FOV modification specified by the FOV modification command until elapse of a time period.

13. The method of claim 12 further comprising, at the streaming media sever, selecting a duration of the time period based, at least in part, on a monitored parameter of the communications network.

14. A method carried-out during a streaming video session occurring between a client media receiver and a streaming media server, the method comprising:
    generating, at the streaming media server, an encoded video stream having a Field of View (FOV);
    transmitting the encoded video stream over a communications network to the client media receiver;
    monitoring for FOV modification commands from the client media receiver requesting adjustments to the FOV of the encoded video stream;
    when receiving a FOV modification command from the client media receiver, modifying the FOV of the encoded video stream in accordance with the received FOV modification command;

at the streaming media server, maintaining the FOV modification specified by the FOV modification command until elapse of a time period; and at the streaming media server, determining a duration of the time period by extracting data from the received FOV modification command.

15. The method of claim 10 further comprising, at the streaming media server:

determining a screen aspect ratio of a display device associated with the client media receiver from the FOV modification commands; and cropping extraneous imagery from the encoded video stream based upon the screen aspect ratio in continued transmission of the encoded video stream.

16. The method of claim 10 further comprising cropping extraneous imagery from the encoded video stream when the FOV modification command is a zoom-in command.

17. A client media receiver operably coupled to a display device, the client media receiver comprising:

a processor; and a computer-readable storage medium storing a computer-executable code that, when executed by the processor, causes the streaming media server to perform the operations of:

receiving an encoded video stream transmitted from a streaming media server over a communications network;

processing the encoded video stream to generate a video output signal for presentation on the display device;

monitoring for user input modifying a Field-of-View (FOV) of the video output signal; and in response to receipt of user input modifying the FOV of the video output signal, transmitting a FOV modification command from the client media receiver to the streaming media server to modify a FOV of the encoded video stream in accordance with the user input wherein the FOV modification command transmitted maintains the FOV modification until an elapse of a time period, and for a duration of the time period by data extracted from the FOV modification command.

18. The client media receiver of claim 17 wherein the computer-executable code that, when executed by the processor, causes the streaming media server to further perform the operation of:

initially implementing the requested modification to the FOV of the video output signal by local processing at the client media receiver substantially concurrently with transmission of the FOV modification to the streaming media server.

19. The client media receiver of claim 17 wherein the computer-executable code that, when executed by the processor, causes the streaming media server to further perform the operation of:

including data in the modification command specifying a time period for maintaining the requested modification to the FOV of the encoded video content.

20. The client media receiver of claim 17 wherein the computer-executable code that, when executed by the processor, causes the streaming media server to further perform the operations of:

after receiving user input modifying the FOV of the video output signal, monitoring for additional user input terminating the requested modification to the FOV of the video output signal; and when receiving additional user input terminating the requested modification to the FOV of the video output signal, transmitting a return-to-default FOV command from the client media receiver to the streaming media server.

* * * * *